United States Patent [19]

Iwata

[11] Patent Number: 5,019,932

[45] Date of Patent: May 28, 1991

[54] HARD DISK DRIVE HAVING A CARRIAGE LOCK MECHANISM

[75] Inventor: Akitoshi Iwata, Ome, Japan

[73] Assignee: Kabushiki Kaisha Toshiba, Kanagawa, Japan

[21] Appl. No.: 451,778

[22] Filed: Dec. 18, 1989

[30] Foreign Application Priority Data

Dec. 23, 1988 [JP] Japan ................................. 63-325349

[51] Int. Cl.$^5$ ................................................. G11B 5/54
[52] U.S. Cl. ..................................... 360/105; 360/104
[58] Field of Search ............ 360/104, 105, 106, 97.62, 360/97.63

[56] References Cited

U.S. PATENT DOCUMENTS 4,605,979 8/1986 Inoue et al. ......................... 360/105

OTHER PUBLICATIONS

IBM TDB, "Carriage Lock", vol. 28, No. 7, Dec. 1985, pp. 2889-2890.
IBM TDB, "Disk Head Load/Unload Mechanism", vol. 30, No. 7, Dec. 1987, pp. 386-387.

*Primary Examiner*—David J. Severin
*Attorney, Agent, or Firm*—Finnegan, Henderson, Farabow, Garrett and Dunner

[57] ABSTRACT

The hard disk drive permits a decrease in the number of component parts and a reduction in the power consumption by having the lock mechanism provided with a lock member having an engaging part for locking the carriage at the position prescribed for locking the carriage by being brought into engagement with a counter-engaging part disposed on the carriage, a first spring for urging the lock member in the direction in which the engaging part is brought into engagement with the counter-engaging part disposed on the carriage, a second spring partially made of a shape memory alloy the shape of which changes from a first shape to a second shape on exposure to heat generated by flow of electric current therein, the second spring for urging the lock member in the direction in which the lock member releases engagement with the counter-engage member disposed on the carriage according to a change of the shape memory alloy's shape from the first shape to the second shape when electric current flows in the shape memory alloy, and a control circuit for controlling the supply of electric power to the second spring.

8 Claims, 4 Drawing Sheets

HARD DISK DRIVE HAVING A CARRIAGE LOCK MECHANISM

BACKGROUND OF THE INVENTION

1. Field of the Invention

This invention relates to a hard disk drive provided with a lock mechanism capable of locking a carriage at a prescribed position.

2. Description of the Prior Art

Hard disk drives are generally provided with a lock mechanism capable of locking a carriage at a prescribed position, for a magnetic head mounted on the carriage is required to be prevented from reaching a data zone of a magnetic disk while the power source of the hard disk drive is kept off service.

FIG. 4 and FIG. 5 show schematically conventional hard disk drive each provided with a lock mechanism capable of locking a carriage at a prescribed position. FIG. 4 shows the device as held in a state having the carriage locked in place and FIG. 5 shows the device as held in a state having the carriage left unlocked.

In these diagrams, 10 stands for a lock mechanism, 30 for a carriage, and 50 for a magnetic disk.

In the lock mechanism 10, a lock member 12 is rotatably supported in place by a shaft 14. The lock member 12 is provided at one end thereof with a claw 16 adapted for engagement with a projecting part 32 formed on a projecting member 40. A projecting member 40 is formed at the side of the carriage 30. Approximately to the middle of the lock member 12, a plunger 18 driven by a DC solenoid 16 is connected. A spring 20 adapted to urge the lock member 12 counterclockwise in the bearing illustrated is laid taut across the space intervening between the other end of the lock member 12 and the exterior of the DC solenoid 16.

The carriage 30 is rotated about a pivot 38 as the center by a drive mechanism comprising a magnet 34 and a VCM coil 36. This carriage 30 is provided on the lateral part thereof with the projecting member 40. The projecting member 40 is provided at the leading end thereof with the projecting part 32 which is adapted to be engaged with the claw 16 of the lock member 12 as described above. A magnetic head 42 is mounted on the leading end of the carriage 30.

The magnetic disk 50 is fixed on a spindle motor 54 by a disk retainer 52 and is rotated by the spindle motor 54. The surface of the magnetic disk 50 is divided into a data zone 56 and a contact start stop (CSS) zone 58. In the data zone 56, data are recorded and reproduced. While the power source for the hard disk drive is kept off service, the magnetic head 42 is positioned on the contact start stop (CCS) zone 58 and in the CCS zone 58 the magnetic head 42 is contacted with the surface of the magnetic disk 50.

The locking of the carriage 30 is started by rotating the carriage 30 thereby effecting retraction of the magnetic head 42 in the CSS zone 58. Consequently, the lock member 12 is rotated by the spring 20 counterclockwise in the bearing illustrated in the diagram. As the result, the carriage 30 is locked by the claw 16 of the lock member 12 being brought into engagement with the projecting part 32 formed on the carriage 30 (FIG. 4).

For release of this lock, the supply of electric current to the DC solenoid 16 is started again. Consequently, the lock member 12 is rotated clockwise in the bearing illustrated by the plunger 18 being drawn in the direction of A in the bearing shown in the diagram. As the result, the claw 16 falls away the projecting part 32 and the carriage 30 is unlocked (FIG. 5). Thereafter, the carriage 30 is rotated in such a manner as to move the magnetic head 42 to the data zone 56 and prepare the magnetic head 42 for recording and reproducing data.

Incidentally, since the lock mechanism in the hard disk drive constructed as described above has the DC solenoid, the plunger, etc. as its component elements, this hard disk drive suffers from undue numerousness of parts and entails difficulties such as high cost of production and complicate maintenance and inspection.

Further, the DC solenoid consumes electric power heavily and adversely affects the power consumption of the hard disk drive.

OBJECT AND SUMMARY OF THE INVENTION

The first object of this invention is to realize a hard disk drive permitting a decrease in the number of parts.

The second object of this invention is to realize a hard disk drive permitting a reduction in power consumption.

To accomplish these objects, this invention provides a hard disk drive having a magnetic head for recording and reproducing data in a magnetic disk, a carriage for supporting in place said magnetic head and moving said magnetic head to position on said magnetic hard disk, and a lock mechanism for locking said carriage at a prescribed position, said lock mechanism comprising a lock member having an engaging part for locking said carriage at the position prescribed for locking said carriage by being brought into engagement with a counter-engaging part disposed on said carriage, a first urging means for urging said lock member in the direction in which said engaging part is brought into engagement with said counter-engaging part disposed on said carriage, a second urging means partially made of a shape memory alloy the shape of which changes from a first shape to a second shape on exposure to heat generated by flow of electric current therein, said second urging means for urging said lock member in the direction in which said lock member releases engagement with said counter-engage member disposed on said carriage according to a change of said shape memory alloy's shape from the first shape to the second shape when electric current flows in said shape memory alloy, and control means for controlling the supply of electric power to said second urging means.

DETAILED DESCRIPTION OF THE PREFERRED EMBODIMENT

Now, the present invention will be described below with reference to a working example.

Figure 1:
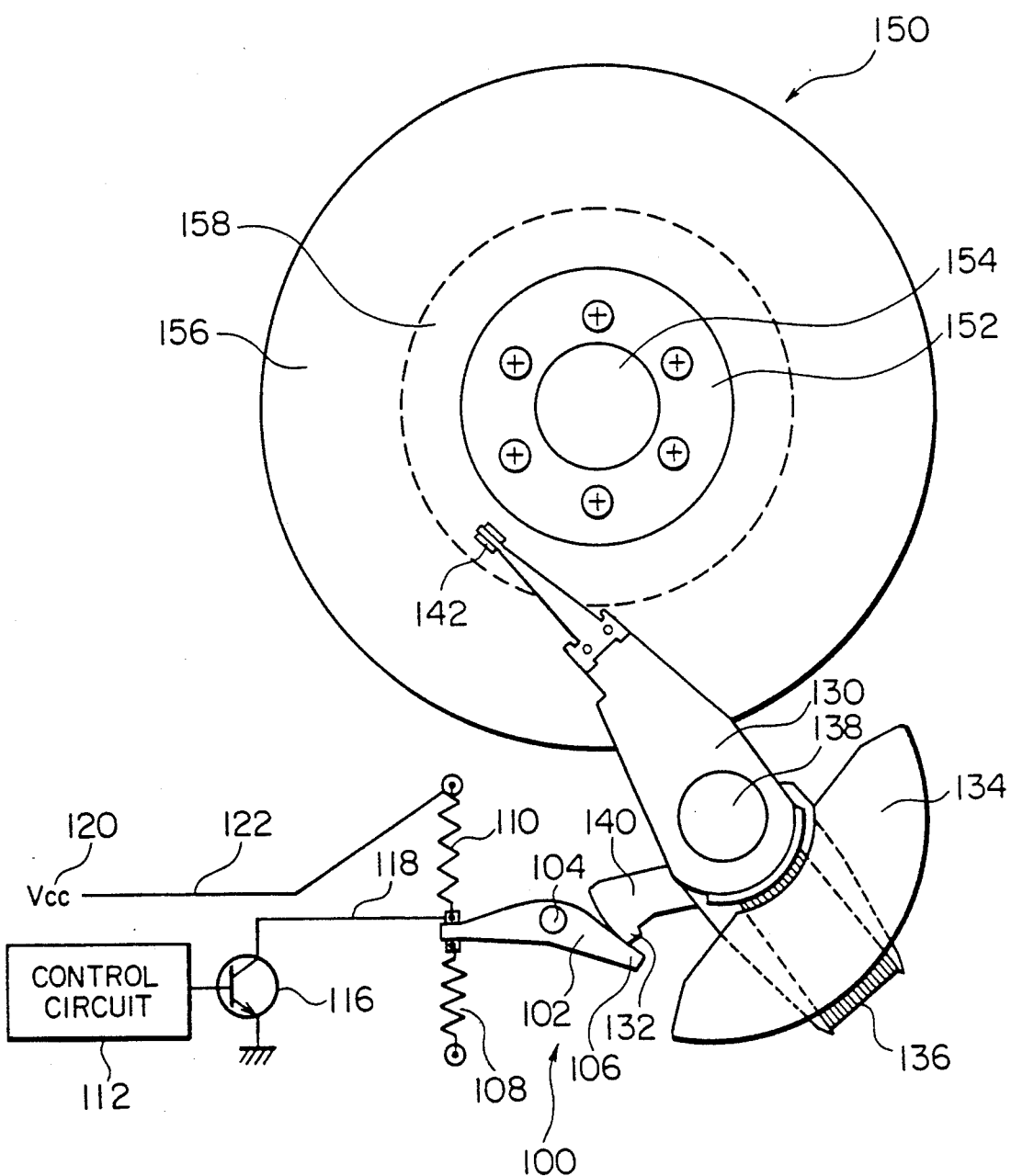
FIG. 1 is a diagram schematically illustrating a hard disk drive as one embodiment of this invention, having a carriage in a locked state.
Figure 2:
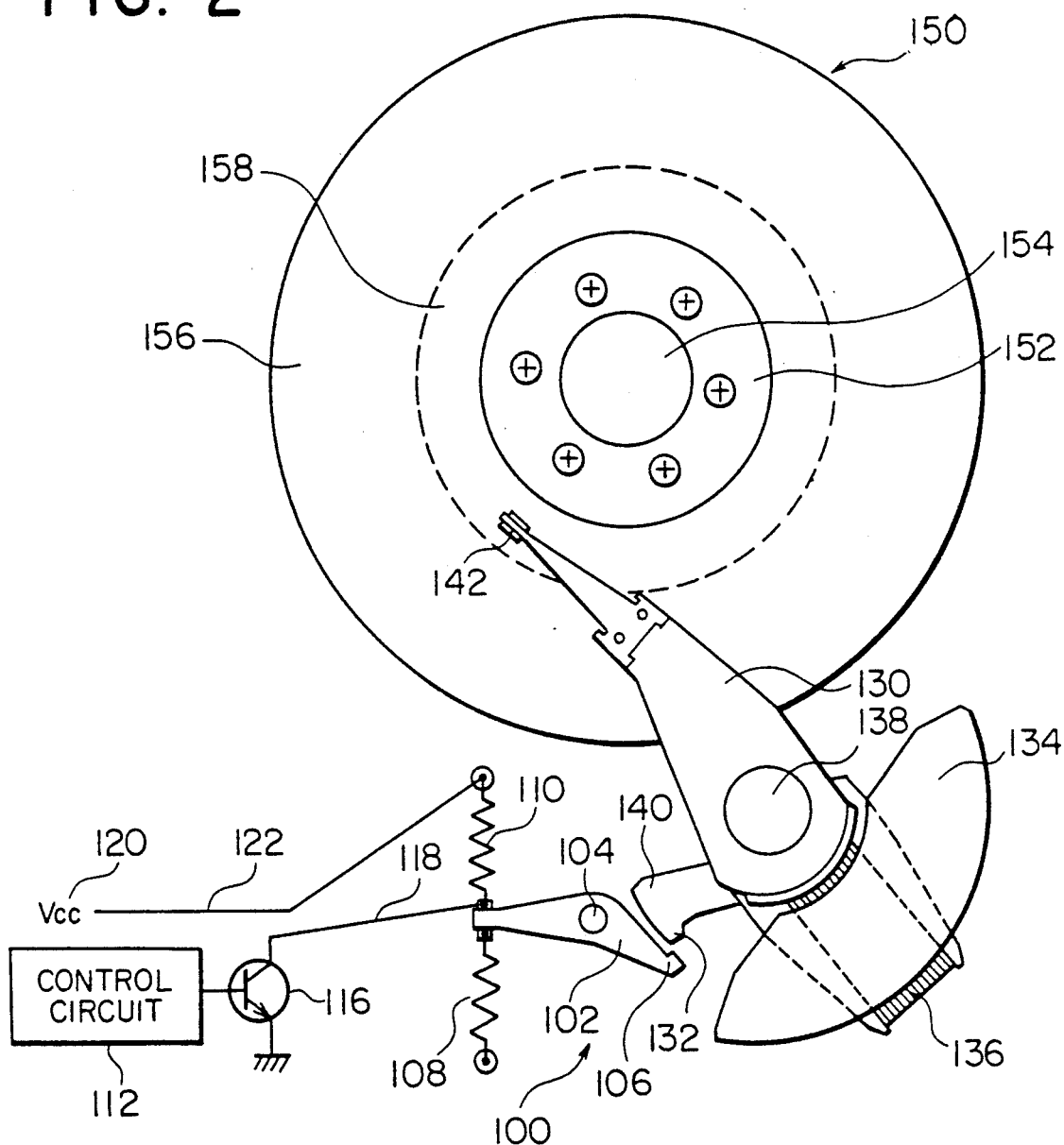
FIG. 2 is a diagram schematically illustrating a hard disk drive as one embodiment of this invention, having a carriage not in a locked state.

FIG. 1 and FIG. 2 are diagrams schematically illustrating a hard disk drive as one embodiment of this invention; FIG. 1 illustrating a carriage held in a locked state and FIG. 2 illustrating the carriage not held in a locked state.

In these diagrams, 100 stands for a lock mechanism, 130 for a carriage, and 150 for a magnetic disk.

In the lock mechanism 100, a lock member 102 is rotatably supported in place by a shaft 104. This lock member 102 is provided at one end thereof with a claw 106 adapted to be engaged with a projecting part 132 disposed on a projecting member 140. The projecting member 140 is formed at the side of the carriage 130. The other end of the lock member 102 is kept drawn by springs 108 and 110 from the opposite sides of the direction of the lock member. To be specific, the spring 108 urges the lock member 102 in the direction in which the claw 106 of the lock member 102 is brought into engagement with the projecting part 132 disposed on the carriage 130. The spring 110 is made of a shape memory alloy shrinkable on exposure to heat generated in consequence of flow of electric current therein and it exhibits lower elasticity during extension and higher elasticity during contraction than the spring 108. The spring 110, therefore, during the course of shrinkage, rotates the lock member 102 in the direction in which the claw 106 of the lock member 102 falls off the projecting part 132 disposed on the carriage 130. A control circuit 112 is connected to one end of the spring 110 through a transistor 116 and a lead wire 118 and is adapted to switch the supply of electric power to the spring 110. To the other end of the spring 110 is connected a Vcc power source 120 through a lead wire 122.

Figure 3:
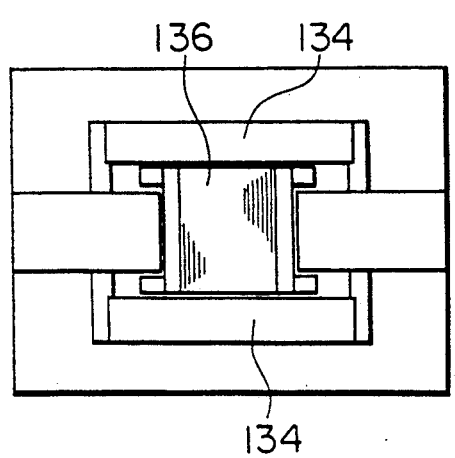
FIG. 3 is a diagram showing the carriage in the device of FIG. 1 and FIG. 2 as seen in the lateral side.

The carriage 130 is rotated about a pivot 138 as the center by a drive mechanism which, as illustrated in FIG. 3, comprises a pair of magnets 134 and 134 fixed on the device proper side and a VCM coil 136 fixed on the side of the carriage 130 interposed between the magnets 134 and 134. The carriage 130 is provided on the lateral part thereof with a projecting member 140. The projecting member 140 is provided at the leading end thereof with the projecting part 132 which is adapted to be engaged with the claw 106 of the lock member as described above. A magnetic head 142 is mounted on the leading end of the carriage 130.

The magnetic disk 150 is fixed on a spindle motor 154 by a disk retainer 152 and is rotated by this spindle motor 154. The surface of the magnetic disk 50 is divided into a data zone 56 and a contact start stop (CSS) zone 58. In the data zone 56, data are recorded and reproduced. While the power source for the hard disk drive is kept off service, the magnetic head 42 is positioned on the contact start stop (CCS) zone 58 and in the CCS zone 58 the magnetic head 42 is contacted with the surface of the magnetic disk 50.

Now, the locking operation of the hard disk drive constructed as described above will be described.

For the carriage 130 to be locked, the carriage 130 is rotated so that the magnetic head 142 will be retracted in the CSS zone 158. And then the supply of electric current to the spring 110 is stopped by the control of a control circuit 112. Consequently, the spring 110 is elongated and, by the tensile force of the spring 108, the lock member 102 is rotated counter-clockwise in the illustrated, namely in the direction in which the claw 106 of the lock member 102 is brought into engagement with the projecting part 132 disposed on the carriage 130. As the result, the claw 106 of the lock member 102 comes into engagement with the projecting part 132 disposed on the carriage 130 and the carriage 130 is locked (FIG. 1).

For this lock to be released, the supply of electric current to the spring 110 is started again by the control of the control circuit 112. Consequently the spring 110 is contracted and, by the tensile force of the spring 110, the lock member 102 is rotated clockwise in the diagram, namely in the direction in which the claw 106 of the lock member 102 falls off the projecting part 132 disposed on the carriage 130. As the result, the claw 106 falls off the projecting part 132 and the carriage 130 is unlocked (FIG. 2). Subsequently, the carriage 130 is rotated so that the magnetic head 142 is moved to the data zone 156 and the magnetic head 142 is enabled to effect recording and reproducing data.

Figure 4:
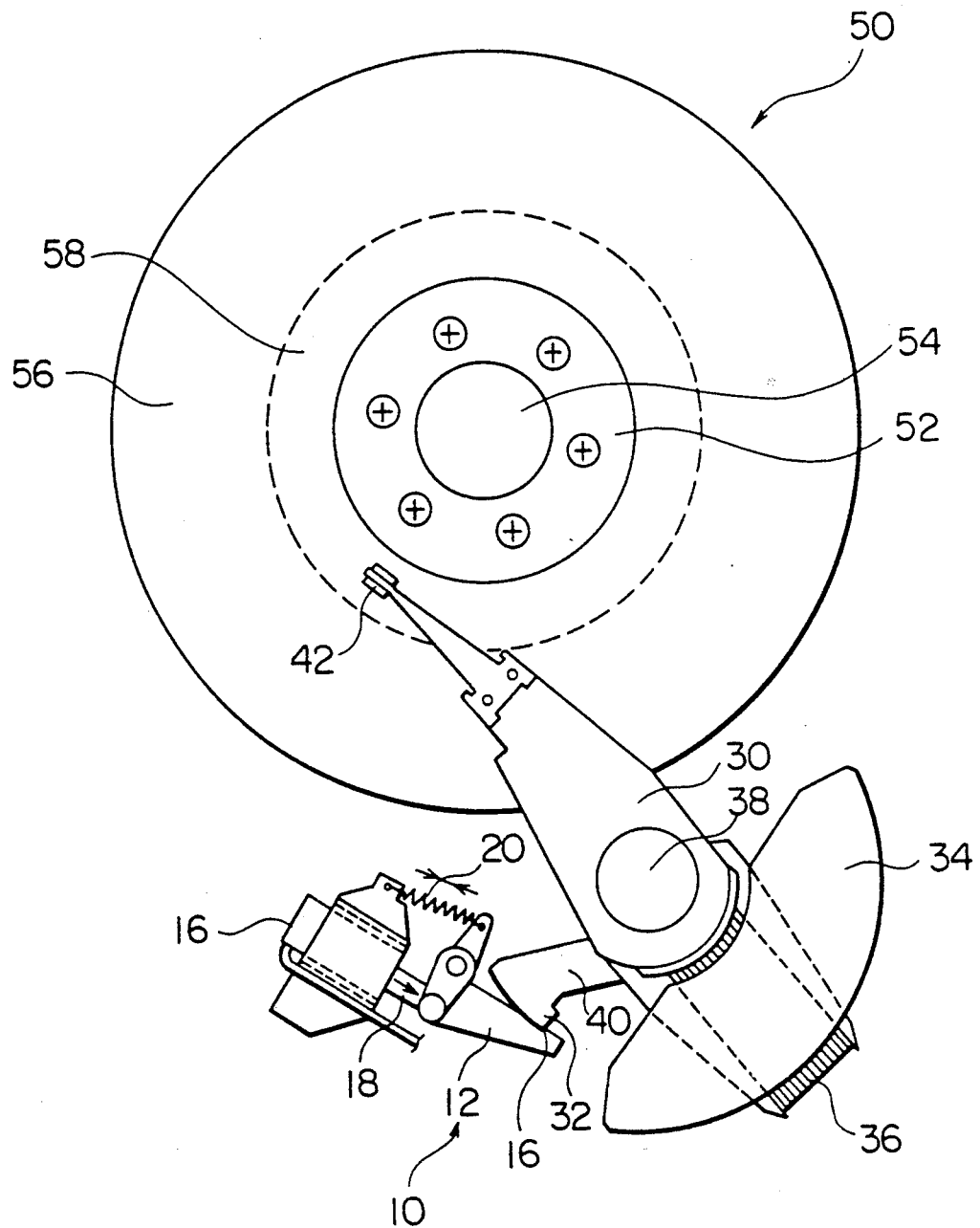
FIG. 4 is a diagram schematically illustrating a conventional hard disk drive, having a carriage in a locked state.
Figure 5:
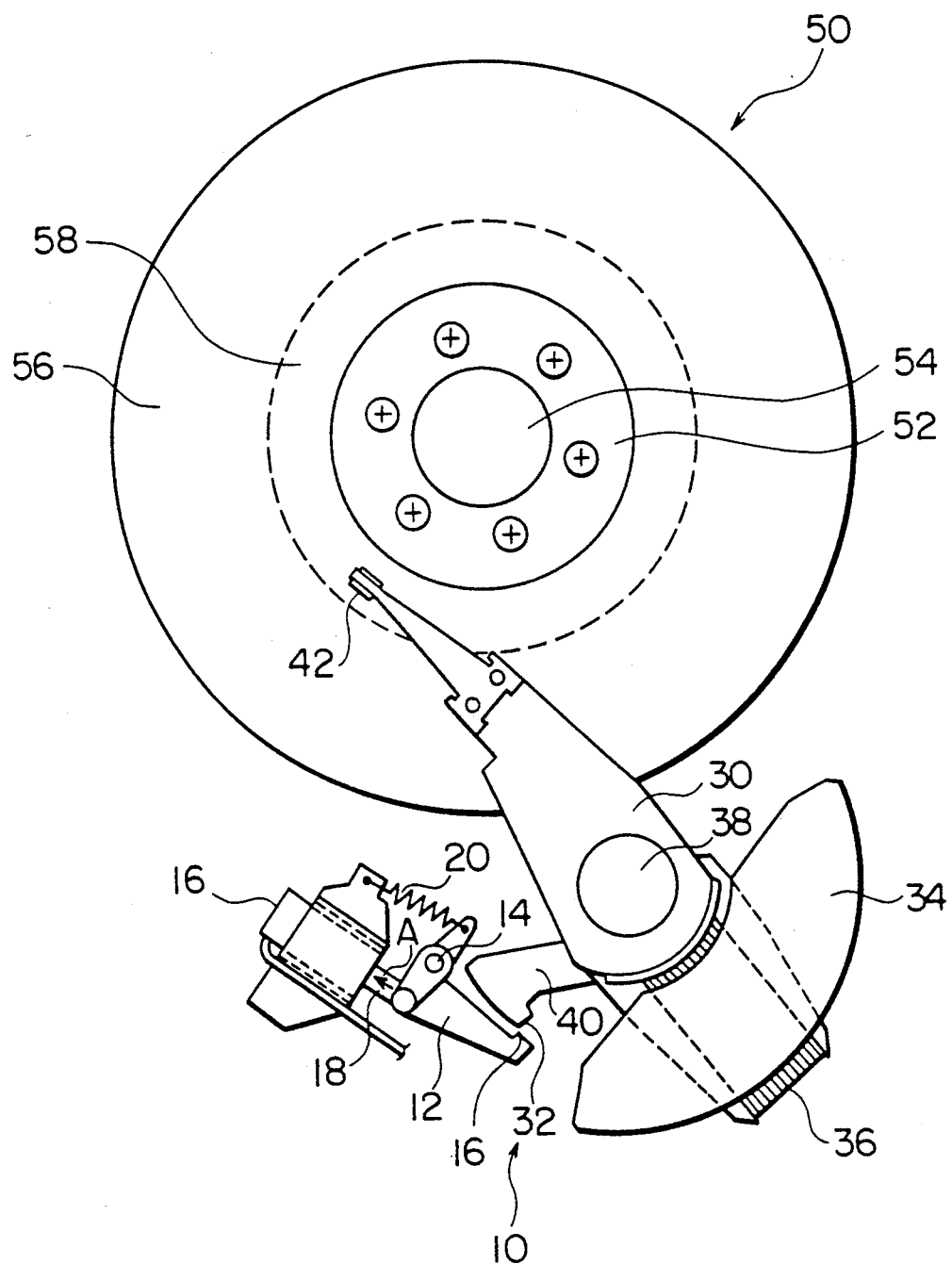
FIG. 5 is a diagram schematically illustrating a conventional hard disk drive, having a carriage not in a locked state.

The hard disk drive of the present embodiment excels the hard disk drive illustrated in FIG. 4 and FIG. 5 in the following respects.

Firstly, it can make the number of component parts decreased and the cost for manufacture lower. The lock mechanism of the hard disk drive illustrated in FIG. 4 and FIG. 5 has the DC solenoid and the plunger as principal component elements. In contrast, the lock mechanism of the hard disk drive of the present invention has the DC solenoid and the plunger covered with the spring 110.

Secondly, the hard disk drive of this invention is advantageous in terms of power consumption. The lock mechanism in the hard disk drive illustrated in FIG. 4 and FIG. 5 requires supply of electric current to the DC solenoid for the purpose of unlocking. In contrast, the lock mechanism of the hard disk drive of the present invention effects the unlocking by simply supplying electric current to the spring 110 which has an extremely small power consumption as compared with the DC solenoid.

Of course, the present invention is not limited to the embodiment described above.

The embodiment described above represents a case in which this invention is applied to the so-called swing arm type carriage. Optionally, this invention may be embodied with the so-called linear type carriage.

Further, the embodiment described above is illustrated as using a spring type expansion member, for example. Of course, the expansion member may be in the form of a rod or in the form of a plunger. As recited in the claims herein, the expansion member may be formed in any desired shape so long as it is made of a shape memory alloy which is capable of transformating on exposure to heat generated by passage of electric current therethrough.

What is claimed is:

1. A hard disk drive having a magnetic head for recording and reproducing data in a magnetic disk, a carriage for supporting in place said magnetic head and moving said magnetic head to position on said magnetic disk, and a lock mechanism for locking said carriage at a prescribed position, said lock mechanism comprising:
a lock member having an engaging part for locking said carriage at the position prescribed for locking said carriage by being brought into engagement with a counter-engaging part disposed on said carriage, a first urging means for urging said lock member in the direction in which said engaging part is brought into engagement with said counter-engaging part disposed on said carriage, a second urging means having a shape memory alloy the shape of which changes from a first shape to a second shape on exposure to heat generated by flow of electric current therein, said second urging means for urging said lock member in the direction in which said lock member releases engagement with said counter-engage member disposed on said carriage according to a change of said shape memory alloy's shape from the first shape to the second shape when electric current flows in said shape memory alloy, and control means for controlling the supply of electric power to said second urging means.

2. A hard disk drive according to claim 1, wherein said carriage is driven by means of a swing arm.

3. A hard disk drive according to claim 1, wherein said carriage is driven by means of a linear drive device.

4. A hard disk drive according to claim 1, wherein said shape memory alloy is in the form of a bar.

5. A hard disk drive according to claim 1, wherein said shape memory alloy is in the form of a spring.

6. A hard disk drive according to claim 5, wherein the spring is coil shaped.

7. A hard disk drive according to claim 1, further including a pivot shaft, said lock member being pivotable about said shaft.

8. A hard disk drive according to claim 7, wherein said first urging means is disposed on a first side of the lock member to pivot the lock member in a first direction, and the second urging means is disposed on a second side of the lock member opposite said first side, to pivot the lock member in a second direction opposite the first direction.

* * * * *